United States Patent [19]

Lohr et al.

[11] 4,347,151

[45] Aug. 31, 1982

[54] CLEANER-POLISH FOR FIBERGLASS AND CERAMIC SURFACES

[75] Inventors: Robert H. Lohr, Union Grove; Lee W. Morgan, Racine, both of Wis.

[73] Assignee: S. C. Johnson & Son, Inc., Racine, Wis.

[21] Appl. No.: 279,126

[22] Filed: Jun. 30, 1981

[51] Int. Cl.$^3$ .............................................. C11D 17/00
[52] U.S. Cl. .................................... 252/163; 252/167; 252/168; 252/170; 252/172; 252/173; 252/174.23
[58] Field of Search ............... 252/167, 168, 163, 170, 252/172, 173, DIG. 2, DIG. 14, 174.23

[56] References Cited

U.S. PATENT DOCUMENTS

| | | | |
|---|---|---|---|
| 3,862,906 | 1/1975 | Chambon et al. | 252/174.23 X |
| 3,956,162 | 5/1976 | Lautenberger | 252/167 X |
| 4,093,418 | 6/1978 | Compton et al. | 252/170 X |
| 4,203,859 | 5/1980 | Kirn et al. | 252/174.23 |

*Primary Examiner*—Shrive P. Beck

[57] ABSTRACT

A cleaner-polish for kitchen and bathroom surfaces comprising from about 0.3 to 8% of an anionic or nonionic surfactant which produces an oil-in-water emulsion, from about 0 to 18% of an abrasive, from about 5 to 40% of an isoparaffinic hydrocarbon having a kauributanol value of from 27 to 29, from about 1 to 8% by weight of a polymer having a number average molecular weight greater than 3,000 and soluble in said hydrocarbon and the balance water.

7 Claims, No Drawings

CLEANER-POLISH FOR FIBERGLASS AND CERAMIC SURFACES

BACKGROUND AND BRIEF DESCRIPTION OF THE PRIOR ART

This invention relates to a cleaner for fiberglass, ceramic and other synthetic surfaces which deposits a glossy protective film. More particularly this invention relates to a cleaner polish for surfaces utilized in bathrooms and kitchens which incorporates an oil soluble polymer.

Shower and tub enclosures have in the past been made primarily from porcelain or ceramic surfaces. These materials are primarily vitreous glassy materials which can be cleaned utilizing a variety of highly abrasive products. Recently fiberglass has become an important material for use in fabricated shower and tub enclosures. Cleansers which were suitable for use on ceramic and porcelain tub and showers are not suitable for use on fiberglass surfaces. This is because fiberglass is relatively easily scratched by the abrasives used in the cleaners. Since fiberglass is a softer material, it is desirable to form a protective, non-slippery film at the same time the surface is cleaned. These properties are desirable for other surfaces.

U.S. Pat. No. 2,995,047 describes a cleaning composition incorporating a small amount of a dimethylpolysiloxane oil, a water miscible organic solvent, a surfactant and water. These compositions are described as being oil in water emulsions and are designed to provide a glossy surface which is smooth and slippery.

Our co-pending commonly assigned application, Ser. No. 159,723 filed June 16, 1980 describes an automobile polish composition which is an oil in water emulsion containing solvent-soluble polymers, water, abrasive agents, silicones and waxes. The polymers of this application are soluble in the solvent utilized in the present invention.

BRIEF DESCRIPTION OF THE PRESENT INVENTION

The present invention comprises an oil in water emulsion containing an isoparaffinic hydrocarbon having a kauri-butanol value of from about 27 to 29 and a polymer soluble in that solvent plug surfactants which will produce an oil in water emulsion and water. This composition will clean and leave a non-slippery, glossy, protective film on bathroom fixtures and especially on fiberglass fixtures.

OBJECTS AND ADVANTAGES

It is therefore the primary object of the present invention to provide a cleaner for bathroom fixtures which will at the same time apply a protective film to those fixtures.

It is a further object of the present invention to provide a cleaner-polish for fiberglass surfaces which will effectively clean and protect these surfaces without harming the fiberglass.

It is a still further object to provide a non-slippery film which will restore some luster to previously dulled bathroom surfaces.

It is a still further object of the present invention to provide a cleaner-polish which will remove previously deposited similar polymer films preventing excessive buildup after long term use of the product.

It is a still further object of the present invention to provide a hard surface cleaner polish for ceramic surfaces which will not adversely affect caulking.

Still further objects and advantages of the present invention will become more apparent in the following more detailed description thereof.

DETAILED DESCRIPTION OF THE INVENTION

The present invention comprises a cleaner polish for fiberglass and ceramic surfaces comprising:

(a) From about 0.3 to 8% of an anionic or nonionic surfactant which will produce an oil-in-water emulsion;

(b) From about 0 to 18% by weight of an abrasive agent;

(c) From about 5 to 40% by weight of an isoparaffinic hydrocarbon having a kauri-butanol value of from about 27 to 29;

(d) From about 1 to 8% by weight of a polymer soluble in said solvent and having a $M_n$ of greater than 3,000, said polymer comprising at least 80% of t-butyl styrene, vinyl toluene, isobornyl methacrylate, isobornyl acrylate, cyclohexyl acrylate, cyclohexyl methacrylate and mixtures thereof.

(e) About 30 to 90% by weight water.

The above formulation provides good cleaning while at the same time provides a protective film on the fiberglass or ceramic surface which will inhibit resoiling.

The first component of the composition of the present invention is a surfactant. Substantially any nonionic or anionic surfactant which will form an oil in water emulsion can be utilized. From 0.3 to 8% by weight of the surfactant should be present in the composition. Within this range there is sufficient surfactant present to form a stable emulsion without interfering with the film forming properties of the polymer. The preferred compositions include 0.5 to 1.5% surfactant.

Suitable surfactants are described in the 1980 North American edition of McCutcheon's Detergents and Emulsifiers and also in the 1980 International edition of McCutcheon's Detergents and Emulsifiers, which disclosures are hereby incorporated by reference. Preferred surfactants include the so-called amine soaps such as morpholene oleate, triethanolamine oleate, diethanolamine oleate, diethanolamine stearate and the like. Also certain nonionics can be utilized.

The composition also optionally may contain an abrasive agent to further aid cleaning and to assist in the removal of stubborn soils. Care must be exercised in choosing the appropriate abrasive if the composition is designed to be utilized on fiberglass surfaces. Suitable abrasives include diatomaceous earth, aluminum silicates and the like. Abrasives should be present in an amount of from 0-18% and preferably from 10 to 15% by weight. Above 18%, the abrasive is difficult to disperse into a stable emulsion composition.

The composition of the present invention also includes from 5 to 40% and preferably from 15 to 25% by weight of an isoparaffinic hydrocarbon having a kauri-butanol value of from about 27 to 29. These compositions have a calculated solubility perameter of from 7 to 7.3. Below 5% there is insufficient solvent to clean adequately, while above 40% balanced cleaning is reduced, i.e., aqueous soils are not properly cleaned. Solvents with kauri-butanol values much higher than 29 will attack caulking between ceramic tiles.

Isoparaffinic hydrocarbons, such as those available from Exxon Corporation, Houston, Texas, are defined as narrow cut, mixed, saturated branched chain hydrocarbons. These mixtures are characterized by boiling range and include solvents having a boiling range of 97° to 107° C. to those having boiling ranges of 207° to 254° C. Accordingly, any isoparaffinic mixture having a boiling range within the range of from 97° to 254° C. can be utilized as the solvent in the composition of the present invention. It is preferred that certain mid-range isoparaffinic hydrocarbons be utilized such as those having boiling ranges of between 176° to 206° C.

The compositions of the present invention also include from about 1 to 8% and preferably from 3 to 5% by weight of a polymer having a $M_n$ of greater than 3,000 and soluble in the above solvents. Within the range, a stable system with good filmforming and protective properties results.

The polymers used in the composition of the present invention should form films which are hard, glossy and non-slippery. These films should not be attacked by solvents used in many commercial hard surface cleaners, such as butyl cellosolve. The polymers must, at the same time, be soluble in the isoparaffinic solvents used in the present composition. It has been found that polymers having at least 80% of at least one hard monomer which also are soluble in the isoparaffinic solvent are necessary. Examples of suitable hard monomers which form isoparaffinic soluble polymers include isobornyl acrylate, cyclohexyl methacrylate, cyclohexyl acrylate, vinyl toluene, t-butyl styrene and mixtures thereof.

As comonomers, in amounts up to 20%, other hard and soft monomers include styrene, alpha methyl styrene, methyl methacrylate, 2-ethyl-hexyl-methacrylate, 2-ethyl-hexyl-acrylate, butyl acrylate and the like. These monomers are either too soft to form a hard, non-tacky film, or are too polar to be soluble in the isoparaffinic solvents. For the purpose of this specification and the following claims, the term "Hard Monomer" means a monomer who's homopolymer has a brittle point in excess of 20° C.

Suitable polymers are those including monomer combinations of isobornyl methacrylate and methylmethacrylate, isobornyl methacrylate and vinyl toluene and vinyl toluene and cyclohexyl methacrylate. Mixtures of these polymers also may be utilized. Suitable polymers are prepared utilizing solution formulation processes which are well within the skill of those skilled in the polymerization art. Preferred polymers include polymers having 85% isobornyl methacrylate and 15% methylmethacrylate, 85% vinyl toluene and 15% isobornyl methacrylate, 85% vinyl toluene and 15% cyclohexyl methacrylate.

The polymers used in the composition of the present invention are film formers and deposit a hard, glossy, non-slippery film on the substrate. These polymers are soluble in the solvent phase and are readily dispersed in the solvent phase in the above oil in water emulsion. These polymers are self sensitive in that further applications of the cleaner polish of the present invention will remove and redisburse the prior coating thereby preventing buildup and discoloration problems on the fiberglass and ceramic tile surface. Furthermore the polymers utilized have good film forming properties and aid in repelling the adherence of dirt to the substrate.

The composition of this invention effectively cleans and shines ceramic and fiberglass surfaces without damaging caulking or grouting which may be present. These compositions are readily prepared utilizing standard emulsification techniques. Often it is desirable to prepare the soaps, if used, in situ. Also, other optional ingredients such as thickeners including ethylene maleic anhydride resins, carboxylic polymers or carboxy methylcellulose can be utilized. In addition to thickeners a very small percentage of a silicone fluid can be added to the formulation to aid application properties. Small amounts of preservative, fungicide, dye and fragrance can be incorporated into formulation of the present invention.

These formulations are prepared by combining the isoparaffinic hydrocarbon and the polymer along with the fatty acid with heat and slight agitation to insure complete solution. Water is charged to a separate container and heated and the diatomaceous earth or other abrasive, amine and the oil base are slowly added to the water. After this time, the thickener is added and the composition is then cooled to room temperature.

The composition of the present invention will now be illustrated by way of the following examples which are for the purpose of illustration only and are in no way to be considered as limiting.

EXAMPLE I

The following formulation is prepared:

| | |
|---|---|
| Ethylene Maleic Anhydride Resin 2% solution in water (EMA-91 - Monsanto) | 10% |
| Morpholine | 1% |
| Ammonium Hydroxide (28% solution) | 0.3% |
| Oleic Acid | 1% |
| Diatomaceous Earth (Superfloss - Johns-Mansville) | 14% |
| Dimethyl Silicone Fluid 10,000 csts | 0.4% |
| Isoparaffinic Hydrocarbon (boiling range 176 to 188° C. - Isopar K) | 19% |
| Water | 46.3% |
| Polymer of 85% Isobornyl Methacrylate and 15% Methymethacrylate (50% solution in Isopar G - boiling range 156–176° C.) $M_n = 5,380$, $M_w$ 12,600, $M_z = 23,500$ | 8% |

The dimethyl silicone fluid, isoparaffinic hydrocarbon, fatty acid and polymer are heated to 140° F. with slight agitation to insure complete solution. Water is charged to a separate container at 140° F. The following components are then added in order to the water with vigorous agitation: the diatomaceous earth, the morpholine and the polymer-solvent-silicone-oleic acid mixture. The agitation is then continued for two minutes. After this time the ammonium hydroxide is added with continued agitation. The ethylene maleic anhydride resin solution is slowly added. The mixture is then agitated to uniformity and force cooled to 90° F.

This product when utilized to clean bathroom fixtures removed the accumulated soil on the enclosure and left a glossy film.

EXAMPLE II

A series of formulations were prepared utilizing different solvents. The solvents are shown in Table 1.

| | |
|---|---|
| Aqueous Solution of EMA-91 (10%) | 20% |
| Morpholine | 1% |
| Ammonium Hydroxide (28%) | 0.3% |
| Oleic Acid | 1% |
| Diatemaceous Earth (Superfloss) | 15% |
| Silicone Fluid 10,000 cstks. | 0.4% |
| Solvent | 19.5% |
| Water | 44.80% |
| 85% Polymer of Example I | 8% |

TABLE 1

| RUN | SOLVENT | PERFORMANCE |
| --- | --- | --- |
| A | Isopar K BR* = 177–197° C. | No Smear-Uniform film |
| B | Isopar L BR = 188–216° C. | Slight Smear-Good soil removal |
| C | Isopar M BR = 207–254° C. | Slow drying-Smear & haze during buff |
| D | Isopar G BR = 156–176° C. | No Smear-generally uniform film |

*BR—Boiling range from initial boiling points to dry point

The products were evaluted by applying a small amount to a grouted ceramic tile panel which had been previously artificially soiled using soap mixed with 500 ppm hardness water. The application properties, cleaning properties and drying properties of these products were observed.

EXAMPLE III

The following formulation was prepared:

| | |
| --- | --- |
| EMA-91 (2% solution) | 10% |
| Morpholine | 1% |
| Ammonia 28% | 0.3% |
| Oleic Acid | 1% |
| Diatomaceous Earth (Superfloss) | 9% |
| Silicone Fluid 10,000 cstks. | 0.5% |
| Isopar E (BR = 116–134° C.) | 10% |
| Water | 59.7% |
| 85 Isobornyl Methacrylate/15 Methylmethacrylate (Polymer) 61.5% Non-Volatile | 8.5% |

This formulation was tested on artificial soil as in Examples I and II. This formulation removed the artificial soap scum off the ceramic tile panels. In an in-home testing, however, the relatively low level of solvent gave slightly poorer removal of soap scum.

EXAMPLES IV through VI

Formulations of Example 3 were repeated with the exception that the solvent level was increased to 15, 25 and 30% with a corresponding decrease in the water level. Each of these formulations was tested on artificial soil in the Lab. The 15% and 25% solvent formulations removed soap scum well, however, the 30% had lower level of performance. In home testing the 15 to 25% solvent formulas removed soap scum quite well and noticeably better than that of Example 4. 30% solvent formulation in Example 6 was not tested in homes.

EXAMPLE VII

The following formulations appeared:

| | |
| --- | --- |
| EMA 91 (2% aqueous solution) | 10% |
| Morpholine | 1% |
| Ammonia (28%) | 0.3% |
| Oleic acid | 1% |
| Diatomaceous Earth (Superfloss) | 14% |
| Silicone Fluid 100 cstks | 0.4% |
| Isopar K | 12.7% |
| Isopar L | 6.3% |
| Water | 46.3% |
| 85 Isobornyl Methacrylate/15% Methylmethacrylate Polymer (50% Non-Volatile Polymer) | 8% |

In in-home testing on areas of moderate to heavy soap film this formula showed considerable smearing during buffing. The film was difficult to buff to uniformity. There was reasonable soap scum and soil removal.

EXAMPLE VIII

The formulation of Example I was repeated except the polymer was replaced with 8.2% of a polymer of 85% vinyl toluene/15% cyclohexyl methacrylate having 48.7% non volatile. This polymer showed initial good performance in the laboratory having great ease of buffing and lubricity. Also these products had good initial resistance to commercially available bathroom cleaner such as Dow aerosol bathroom cleaner.

EXAMPLE IX

The formulation of Example I was repeated with the exception that the polymer was replaced by 8.2% of an 85% vinyl toluene/15% isobornyl methymethacrylate polymer at 48.9% non volatiles. This formulation had ease of use approximately equal to that of Example I as well as approximately similar resistance to commercial cleaners. The lubricity is also quite good.

EXAMPLE X

The formulation of Example I was repeated with the exception that the following abrasives were utilized in place of the diatomaceous earth (Superfloss): Satintone #1 (an aluminum silicate); Satintone #5 (an aluminum silicate); Imsil A 108 (an amorphous silica); Imsil A-10 (an amorphous silica); Kaopolite SF (an aluminum silicate); diatomaceous earth (Snowfloss) and a dry ground mica. The formulations with the Kaopolite and the dry ground mica had good application properties but were hard to buff. The two Imsil products had good application but buff was also relatively hard. The diatomaceous earth (Snowfloss) product had good overall buffing properties showing slight powdering with buffing. The Snowfloss is a tan color which discolored the product. The Superfloss and the two Satintone abrasives had good overall working properties.

What we claim is:

1. A cleaner-polish for kitchen and bathroom surfaces, comprising:
   (a) From about 0.3 to 8% of an anionic and nonionic surfactant which will produce an oil in water emulsion;
   (b) From about 0 to 18% by weight of an abrasive;
   (c) From about 5 to about 40% by weight of an isoparaffinic hydrocarbon having a kauri-butanol value of from about 27 to 29;
   (d) From about 1 to 8% by weight of a polymer having $M_n$ of greater than 3,000 and soluble in said hydrocarbon, said polymer comprising at least 80% of isobornyl acrylate, isobornyl methacrylate, cyclohexyl acrylate, cyclohexyl methacrylate, vinyl toluene, t-butyl styrene and mixtures thereof;
   (e) And about 30 to 90% by weight water.

2. The composition of claim 1 wherein the surfactant is an anionic soap formed utilizing a volatile cation.

3. The composition of claim 1 wherein the surfactant is present in an amount of from 0.5 to 1.5% by weight.

4. The composition of claim 1 wherein the isoparaffinic hydrocarbon has a boiling range of from 176° to 206° C.

5. The composition of claim 1 wherein the composition includes from 0 to 1% by weight of a silicone fluid.

6. The composition of claim 1 wherein the isoparaffinic hydrocarbon is present in the amount of from 15 to 25% by weight.

7. The composition of claim 1 wherein the polymer is present in the amount of from 3 to 5% by weight.

* * * * *